United States Patent [19]

Papst et al.

[11] Patent Number: 4,851,039

[45] Date of Patent: Jul. 25, 1989

[54] PROCESS FOR THE PRODUCTION OF PIG IRON USING CYCLONE

[75] Inventors: Gero Papst, Kaarst; Rolf Hauk, Achern, both of Fed. Rep. of Germany

[73] Assignee: Korf Engineering GmbH, Fed. Rep. of Germany

[21] Appl. No.: 188,715

[22] Filed: Apr. 29, 1988

Related U.S. Application Data

[63] Continuation-in-part of Ser. No. 820,189, Jan. 17, 1986, abandoned.

[30] Foreign Application Priority Data

Jan. 21, 1985 [DE] Fed. Rep. of Germany ....... 3502306

[51] Int. Cl.$^4$ ............................................. C21B 13/12
[52] U.S. Cl. .................................. 75/10.15; 75/10.22; 75/38; 75/40; 75/26
[58] Field of Search ..................... 75/10.15, 10.22, 26, 75/38, 40, 43

[56] References Cited

U.S. PATENT DOCUMENTS

| | | | |
|---|---|---|---|
| 2,973,260 | 2/1961 | Nogiwa | 75/26 |
| 3,028,231 | 4/1962 | Klemantaski et al. | 75/40 |
| 4,087,274 | 5/1978 | Edenwall et al. | 75/10.22 |
| 4,334,919 | 1/1982 | Queneau et al. | 75/26 |

Primary Examiner—Melvyn J. Andrews

[57] ABSTRACT

A process for the production of pig iron from fine ore is described, in which initially the fine ore undergoes prereduction to a degree of metallization of preferably 65 to 75%. The sponge iron obtained is then melted down and under goes a final reduction. This process takes place in a melting cyclone 2; to which the sponge iron is supplied by means of a central opening 1 and into which are tangetially blown via a lateral opening 3 a carbon carrier, an oxygen-containing gas and optionally fluxes. As a result of the angular momentum produced, the sponge iron particles are deflected to the side and melted and finally reduced by the combustion gases of the carbon carrier. The molten iron collects in an iron bath 8. The gas produced in the melting cyclone is cooled from approximately 1500° C. to approximately 800° C. in a waste heat system 10, as well as by admixing cooling gas supplied via a line 11 and is then used for the prereduction of the iron ore.

19 Claims, 1 Drawing Sheet

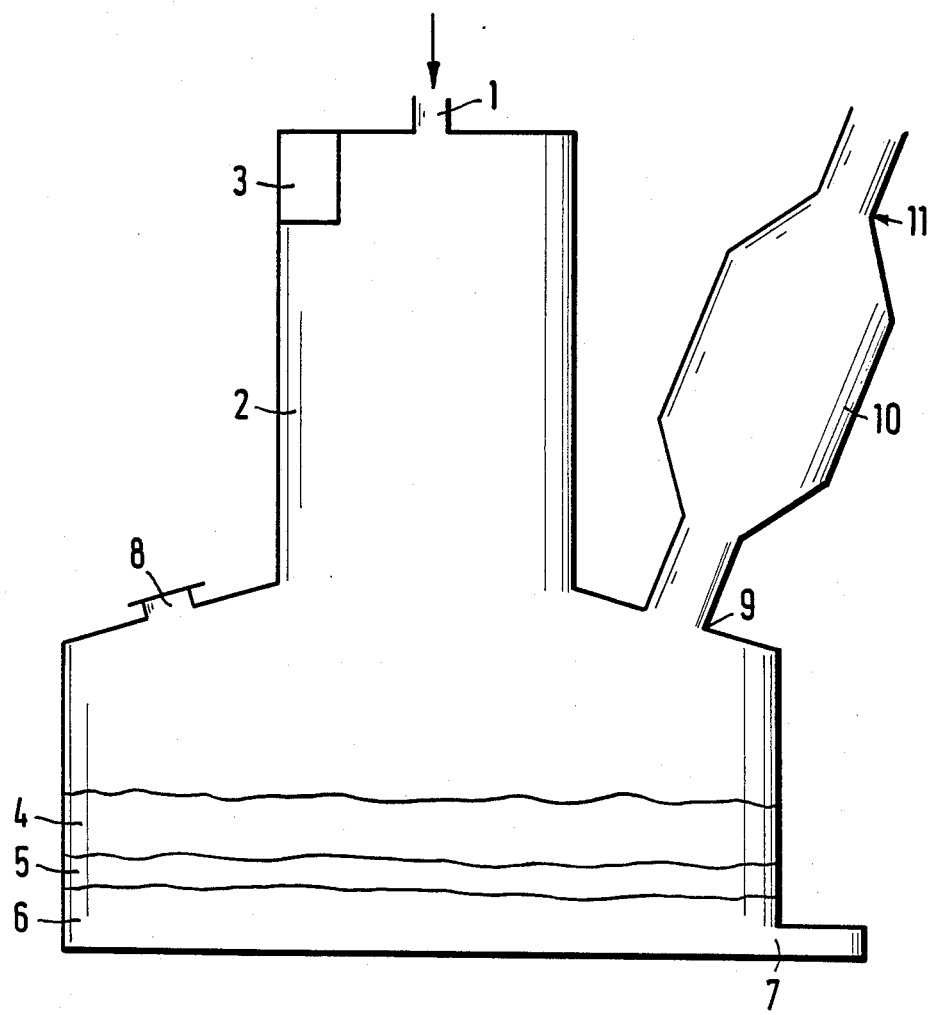

PROCESS FOR THE PRODUCTION OF PIG IRON USING CYCLONE

The present disclosure is a continuation-in-part of application Ser. No. 06/820,189, filed on 01/17/86, now abandoned.

The invention relates to a process for the production of pig iron from fine ore, in which the fine ore is initially prereduced and the thus obtained sponge iron melted down and in this state undergoes final reduction, whereby apart from the sponge iron a carbon carrier, an oxygen-containing gas and optionally fluxes are supplied.

The term "melting reduction processes" is understood to mean those processes in which ores or prereduced ores are reduced to a significant extent in the liquid state to molten iron or iron alloys. The optionally performed prereduction takes place with the ore in the solid state.

In a known process of this type, the so-called Elred process, fine-grained iron ore concentrate is initially prereduced in a circulating fluidized bed. Coal dust and iron ore dust are blown into the fluidized bed reactor. The fluidized bed is maintained with hot air and recycled gas which is free from $CO_2$. The prereduced ore is discharged from the reactor with a degree of metallization of 70% and is conveyed into a direct current arc furnace for melting down and final reduction. The arc furnace has a central carbon electrode, whilst the counter electrode is formed by the iron bath. The prereduced ore and lime are introduced through a vertical bore in the carbon electrode. Melting down, final reduction and carburization of the pig iron take in the plasma below the electrode. The waste gases of both process stages are converted into electrical energy in a combined gas/steam power plant, which covers the complete consumption of the installation and optionally makes it possible to feed excess energy into the supply network. The melting reduction stage requires a relatively large amount of electric energy, so that energy consumption is very high, whilst the apparatus of the installation is very complicated and costly.

In a process known as the "Inred process", initially fine ore, fine coal and oxygen are blown into a melting chamber and are reacted therein at approximately 1900° C. The ore is melted and reduced to FeO. The coal is partly burnt and partly carbonized. Final reduction slag formation and carburization take place in an electric arc furnace arranged below the melting chamber. Prereduction and final reduction consequently take place in a common reactor vessel. Hereagain waste heat utilization is coupled with an electricity generation, so that this process requires no energy carrier other than coal, but hereagain the coal consumption is very high. A further disadvantage is the electrode consumption of the arc furnace and finally the apparatus expenditure is very high due to the plant for producing the electric energy.

The so-called plasma melt process combines a prereduction stage in the fluidized bed and a final reduction and melting stage using a gas plasma. In the prereduction stage, fine ore is reduced in two successively connected fluidized bed reactors to a degree of metallization of 50 to 70%. The cleaned waste gas of the final reduction stage is used as the reducing agent. The prereduced fine ore is blown into a plasma burner together with slag formation additives, coal dust and recycled gas, said burner projecting into the melting reduction zone of a coke-filled shaft furnace. The plasma burner supplies the high temperature thermal energy for melting and for the final reduction of the fine ore. This process is characterized by a very high electric energy consumption, so that it is particularly disadvantageous from the economic standpoint.

It is therefore the problem of the present invention to so develop a process of the aforementioned type, that it has a relatively low energy consumption and also the apparatus required for performing the same is of a simple constructional type.

According to the invention this problem is solved in that the melting process and the final reduction are performed in a melting cyclone, into which the sponge iron is introduced axially and the oxygen-containing gas and carbon carrier are blown in tangentially. The waste gas produced during the melting process and during the final reduction is used for the prereduction of the fine ore. The fluxes can also be tangentially blown into the melting cyclone. According to a further advantageous development, the twist or angular momentum in the melting cyclone can be modified by corresponding adjustment of the inlet for the oxygen-containing gas. The sponge iron can be introduced into the melting cyclone either pneumatically or via a gastight star wheel means. It is also possible to supply the melting cyclone with lump coke for the formation of the coke layer performing metallurgical work on the slag layer, the coke layer preferably having a height of 20 to 100 cm. As a result of the coke layer, heterogeneities in the FeO content are compensated, because otherwise in the case of fluctuations of the FeO content, the slag would not ensure a constant pig iron quality, particularly with respect to the sulphur content.

When using lower grade coal, i.e. coal with high ash and volatile constituent contents, it may be necessary to raise the temperature in the system, e.g. by afterburning. For this purpose it is possible to introduce into the lower widened part of the melting cyclone oxygen either directly or in the form of heated oxygen or returned process gas via a plasma burner. The tangentially blown in oxygen-containing gas can also be preheated by a plasma burner or recuperatively. For this purpose, preferably $CO_2$ containing waste gas is supplied from the prereduction stage to the plasma burner or burners. In addition, the melting cyclone can be inductively heated.

Chem.-Ing.-Tech, 54, 1982, No. 5, pp 522/523 discloses the use of melting cyclones for obtaining nonferrous metals or there compounds. Fine-grained mixed ores are brought to high temperatures in the rotary flow field, the non-ferrous components to be obtained either being evaporated or sublimated or converted into smelting flux and then the gungue is separated in a following settling tank. By carrying out the process embodying the present invention, the average dwell time for each size particle of carbon carrier, within a specified range of particle sizes, is approximately equal. By "dwell time", it is meant that time the particles are in the melting cyclone in a dwelling position. The following advantages result from the use of the melting cyclone: high heat and material exchange, stabilization of the reaction by return flow zones, as well as optimum adaptability of the angular momentum to the granulation of the fine ore.

The invention is described in greater detail hereinafter relative to an embodiment shown in the drawing, which diagrammatically represents a melting cyclone.

Prereduced sponge iron is e.g. supplied pneumatically or via a star wheel means to the melting cyclone 2 via a central opening in the top region. The prereduction of the iron ore preferably takes place in several stages and can be performed in fluidized beds, reduction cyclones or a flue dust reactor. The reduction gas is constituted by the waste gas of melting cyclone 2 following appropriate cooling. By means of a pipe (not shown) having a pumping means (not shown) fluidically associated therewith, and which intersects the side of the top region at an opening 3, fine coal and fluxes are blown into melting cyclone 2 in a tangential direction at a specified blow-in angle, together with an oxygen-containing gas and preferably pure oxygen. As hereinafter used, the term "blow-in angle" is defined as that angle in a horizontal plane between the wall of the melting cyclone 2 and the axis of the blow-in opening 3. Accordingly, fine coal and fluxes which are tangentially blown in through opening 3 initially follow a path in a horizontal plane and are directed at such initial entry into the melting cyclone 2 generally along a path defined by a tangent formed in the horizontal plane and which includes the cylindrical wall of the top region of the melting cyclone 2 adjacent to the opening 3. Accordingly, at initial entry via opening 3, the tangentially blown-in coal and fluxes follow a path which is generally directed vertically out of the paper in the figure and which follows the curvature of the cyclone wall adjacent to the opening 3. Such tangential velocity produces a centrifugal force which is directed generally radially of the cylindrical melting cyclone wall. The effect produced by such tangential blow in of oxygen-containing gas and carbon carrier particles and an axial movement of sponge iron has the advantageous effect that the carbon carrier by reaction with the oxygen is gasified into the reducing gas CO which is needed for a further reduction of the sponge iron before the carbon carrier and the oxygen come into contact with the sponge iron. This particular interplay of the three movements of the carbon carrier, the sponge iron and the oxygen, i.e., the movement of the carbon carrier with respect to the movement of the oxygen that is different from the movement of the oxygen forms an important aspect of the present invention. The angular momentum which is a function of the angular velocity and the inertia of the carbon carrier particles in the blown-in mixture, leads to the fine sponge iron particles being deflected very rapidly towards the outer wall and they are completely reduced and melted by the resulting hot gasefying gas. Since the reduced iron particles are fed in axially and the oxygen containing gas together with the carbon carrier particles is fed in tangentially, a twist action occurs between such intersecting streams. This twist action includes the aforementioned interplay, and is variable according to the angle of the tangential injection opening, i.e., the blow-in angle. Heavier particles tend to fall quicker than lighter particles in the environment of the melting cyclone. However, it is advantageous to have the dwell time for all particles to be essentially equal. Therefore, for the dwell time of the heavier particles to be essentially equal to the dwell time for the lighter particles, suitable adjustments are made. One such adjustment can include the adjustment of the angular momentum of the initially blown-in stream. Such adjustment can also be achieved by adjusting the blow-in angle. For example, by 15° for special light particles, and by 25° for heavier particles. It is noted that this is an example only, and is not intended to be limiting. Further, it is noted that the preferred blow-in angle lies in the range of about 0° to about 30°. The melted iron subsequently passes as a coke layer 4 and a slag layer 5 and forms an iron bath 6 on the bottom of melting cyclone 2. The pig iron and molten slag are discontinuously tapped through a tap hole 7. As stated, the function of coke layer 4 is to compensate heterogeneities in the FeO content.

By suitably controlling appropriate variables, such as particle size, the angular momentum of the blown-in mixture can be varied. In this regard, the angular momentum will be increased with increasing grain size to accomplish such control. By means of such control, a more uniform, i.e., more homogeneous, adjustment of the average dwell time of the particles with changing grain size distribution in the grain spectrum can be achieved. Thus, since particles which are difficult to reduce are large and heavy particles, such particles are broken into smaller pieces by crush devices prior to their entering the melting cyclone. The particles preferably do not exceed a size of about 10 mm, and the preferred particle size is in the range of about 0 mm to about 7 mm.

In the top of the collecting zone in the widened lower region of melting cyclone 2 are provided openings 8 for the insertion of additional oxygen or plasma burners. With the aid of said burners, it is impossible to increase the temperature in the lower region of melting cyclone 2, if this is not adequate through the combustion of the fine coal introduced through opening 3. The waste gas from the prereduction stage can be used for heating the plasma burner. The oxygen blown in via opening 3 can also be preheated. Finally, it is also possible to additionally inductively heat the melting cyclone.

The gas produced in the melt-down gasefier 2 is suitable as a reducing gas for the prereduction of the fine ore. However, for this purpose it must be cooled from approximately 1500° C. to approximately 800° C. Thus, it passes from a gas outlet 9 initially into a waste heat system 10, where it is cooled to approximately 900° C. By means of a line 11 cooling gas is then admixed therewith, so that it can be set to a suitable reduction temperature. The cooling gas is preferably process gas from the prereduction stage, which has preferably previously undergone $CO_2$ washing.

From the foregoing, it is seen that angular momentum is changed in dependence on the particle size and becomes steeper with increasing grain size, and the angular momentum of the substances introduced tangentially via opening 3 can be modified in a simple manner for setting optimum process conditions, e.g. by a corresponding adjustment of opening 3, and average dwell time for all sizes of carbon carriers particle entering the melting cyclone is approximately equal.

We claim:

1. A process for the production of pig iron from fine iron ore comprising:
   pre-reducing the fine iron ore to sponge iron;
   providing a melting cyclone which includes a cylindrical portion having a vertical wall, a sponge iron inlet directed for an axially and vertically directed feed of sponge iron into the melting cyclone cylindrical portion, a base portion, a tap hole for removing molten metal from the melting cyclone, and heating means for melting sponge iron to a liquid state within the melting cyclone;

performing a melting process and a final reduction in the melting cyclone by:

feeding the sponge iron into the melting cyclone in a vertical direction which is axial of the melting cyclone cylindrical portion;

providing a source of oxygen-containing gas and carbon carrier particles;

fluidically connecting the source of oxygen-containing gas and carbon carrier particles to the melting cyclone cylindrical portion;

feeding a mixture of oxygen-containing gas and carbon carrier particles into the melting cyclone cylindrical portion in a horizontal plane and in a direction which is tangential to the melting cyclone cylindrical portion;

contacting the vertically moving sponge iron with the tangentially and horizontally moving oxygen-containing gas and carbon carrier particles mixture and deflecting the sponge iron towards the vertical wall of the melting cyclone cylindrical portion; and recovering the pig iron from the melting cyclone.

2. Process according to claim 1 wherein waste gas is produced in the melting cyclone during the production of pig iron, and wherein the process further includes using waste gas produced during the melting step and during the final reduction for preparation of the fine iron ore.

3. Process according to claim 1 wherein pure oxygen is used as the oxygen-containing gas.

4. Process according to claim 1 further including prereducing the fine iron ore in several states up to a metallization of 50 to 85%.

5. Process according to claim 1 wherein the sponge iron is introduced pneumatically into the melting cyclone.

6. Process according to claim 1 wherein a coke layer is formed in the melting cyclone and the coke layer has a height in the range of 20 to 100 cm.

7. Process according to claim 1 further including supplying by means of a plasma burner oxygen to the base portion of the melting cyclone.

8. Process according to claim 7 further including preheating the tangentially blown in oxygen-containing gas.

9. Process according to claim 8 further including cooling waste gas generated in the melting cyclone by producing gas in the prereduction step, washing the process gas with $CO_2$ and using the washed gas for cooling.

10. Process according to claim 1 further including using a fluidized bed reactor for the prereduction of the fine iron ore.

11. Process according to claim 7 wherein $CO_2$-containing waste gas is produced in the prereduction stage, and further including supplying $CO_2$-containing waste gas from the prereduction stage to the plasma burner.

12. Process according to claim 1 further including inductively heating the melting cyclone.

13. Process according to claim 1 wherein the vertically moving sponge iron and the tangentially and horizontally moving oxygen-containing gas and carbon carrier mixture are subjected to a twist action, and such twist action is modified by adjusting the inlet for the oxygen containing gas.

14. Process according to claim 1 wherein the vertically moving sponge iron and the tangentially and horizontally moving oxygen-containing gas and carbon carrier mixture are subjected to a twist action, and such twist action is modified by adjusting the angular momentum of the oxygen-containing gas blown into the melting cyclone.

15. Process according to claim 1 wherein the step of feeding the mixture of oxygen-containing gas and carbon carrier mixture further including a step of adjusting an angle with respect to the tangent with which such mixture is initially blown into the melting cyclone.

16. Process according to claim 15 wherein the angle with which the mixture is initially blown into the melting cyclone is up to 30°.

17. Process according to claim 1 wherein the carbon carrier particles have a size of less than 10 mm.

18. Process according to claim 1 wherein feeding the mixture of oxygen-containing gas and carbon carrier particles is adjusted in conditions so that the average dwell time of all carbon-carrier particles fed into the melting cyclone is essentially equal.

19. Process according to claim 1 further including a step of adjusting average dwell time of the carbon-carrier particles to be within a predetermined range by adjusting the angular momentum of the mixture being fed into the melting cyclone.

* * * * *